United States Patent [19]
Earle

[11] 4,087,115
[45] May 2, 1978

[54] MOTOR VEHICLE REAR WHEEL SUSPENSION

[75] Inventor: Anthony Nigel Clifford Earle, Shenfield, England

[73] Assignee: Ford Motor Company, Dearborn, Mich.

[21] Appl. No.: 716,490

[22] Filed: Aug. 20, 1976

Related U.S. Application Data

[63] Continuation-in-part of Ser. No. 615,646, Aug. 22, 1975, abandoned.

[30] Foreign Application Priority Data

Nov. 7, 1974 United Kingdom ............... 48167/74

[51] Int. Cl.² ............................................. B60G 11/10
[52] U.S. Cl. .................................. 280/720; 267/19 R
[58] Field of Search ............... 280/697, 699, 715, 718, 280/720; 267/18, 19 R, 19 A, 31, 32

[56] References Cited
U.S. PATENT DOCUMENTS

| | | |
|---|---|---|
| 3,860,259 | 1/1975 | Allison .................................. 267/18 |
| 3,869,140 | 3/1975 | Allison .................................. 280/715 |
| 3,904,219 | 9/1975 | Guerriero ........................... 280/718 |
| 3,912,296 | 10/1975 | Allison .................................. 267/19 A |

*Primary Examiner*—Joseph F. Peters, Jr.
*Assistant Examiner*—John A. Carroll
*Attorney, Agent, or Firm*—Clifford L. Sadler; Keith L. Zerschling

[57] ABSTRACT

In a motor vehicle rear wheel suspension according to one embodiment of this disclosure, the vehicle body is supported on a rigid rear axle by left and right leaf springs. Each leaf spring is pivotally connected to an axle bracket. The lower ends of left and right shock absorbers are connected to the axle brackets by pivots having transverse horizontal axes that are situated rearwardly of the axle. Each shock absorber has a link that is rigid with an intermediate part thereof and extends forwardly. Each link is connected to the adjacent one of the axle brackets by a pivot having a vertical axis. The construction of the connection between the shock absorbers and the axle permits the shock absorbers to function as reaction members with respect to braking torque loads on the axle.

8 Claims, 3 Drawing Figures

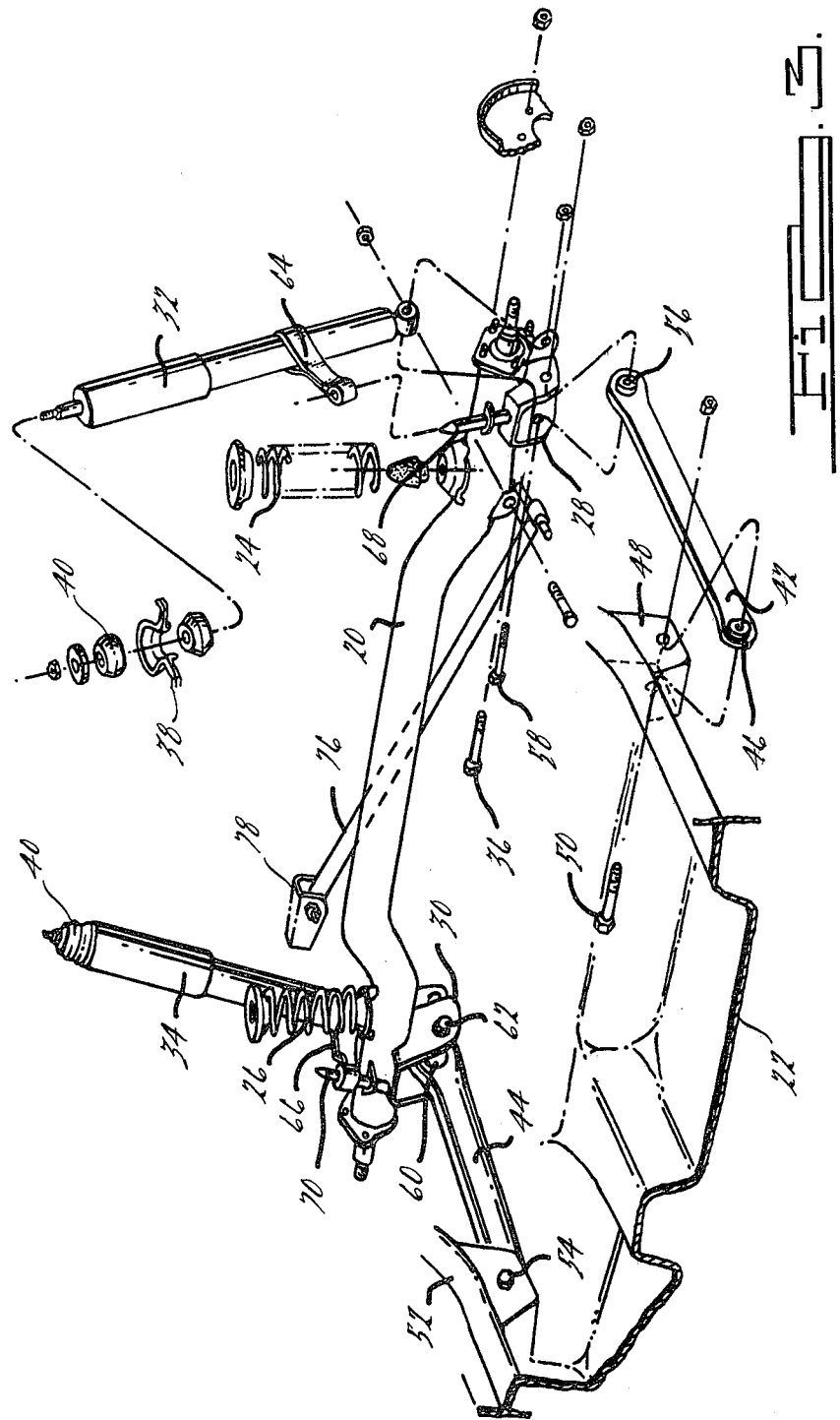

MOTOR VEHICLE REAR WHEEL SUSPENSION

This patent issued upon an application for patent that was a continuation-in-part of earlier patent application Ser. No. 615,646 filed Aug. 22, 1975, and now abandoned.

BACKGROUND AND SUMMARY OF THE DISCLOSURE

The present invention is related to rear suspension systems for motor vehicles, and is particularly concerned with a unique suspension construction having a unique mounting for the rear shock absorbers.

In a motor vehicle rear suspension system according to one embodiment of this invention, the sprung part of the vehicle is supported on a rigid rear axle by left and right leaf springs. Each leaf spring is pivotally connected about a transverse horizontal axis to a bracket member rigid with the rear axle. The lower end of left and right shock absorbers are pivotally connected to the bracket members about transverse horizontal axes disposed to the rear of the axle.

A link rigid with an intermediate part of each shock absorber extends forwardly therefrom and is pivotally connected to the adjacent bracket member about an axis that extends in a vertical direction, the vertical axis being disposed forwardly of the axle.

In a second embodiment, the suspension is of the coil spring type. A pair of longitudinal suspension arms interconnect the rear axle and the vehicle body. The coil springs are interposed between the axle and the vehicle body. In the second embodiment, the shock absorbers are connected to the axle by the same mounting means employed in the first embodiment.

In both embodiments, the unique construction connecting the shock absorbers to the axle allows the shock absorbers to carry braking torque loads. These loads on the axle are transmitted to the shock absorbers without inhibiting roll movement of the vehicle body relative to the axle.

BRIEF DESCRIPTION OF THE DRAWINGS

The many objects and advantages of the present invention will become apparent upon consideration of the following detailed discussion and the accompanying drawings, in which:

FIG. 3 is a perspective view, partly exploded, of the rear suspension of FIG. 2.

DETAILED DESCRIPTION OF THE PREFERRED EMBODIMENTS

Figure 1:
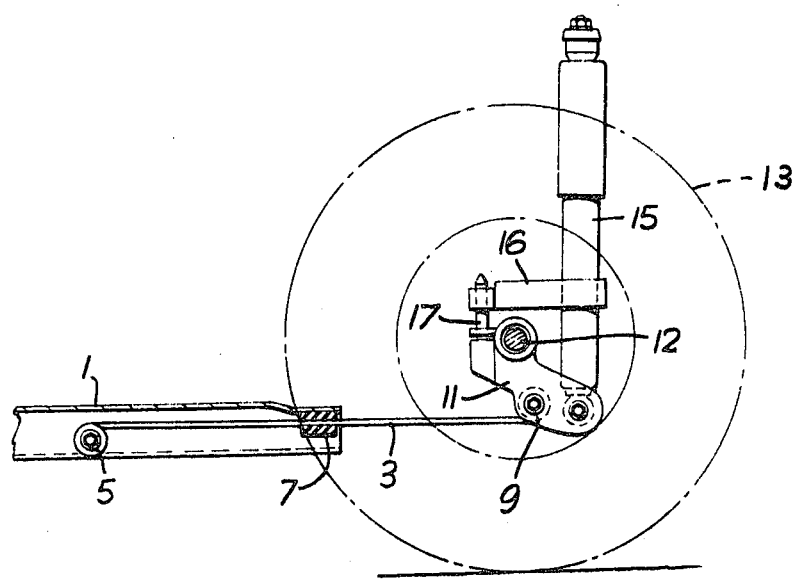
FIG. 1 is a diagrammatic side elevational view of a first embodiment of a rear suspension for a motor vehicle according to the invention.

In accordance with the first embodiment of this invention illustrated in FIG. 1, a motor vehicle body has left and right channel-shape body members. The left channel-shape member is identified by reference numeral 1. The drawing figure shows the left side only of the vehicle suspension, however, the right side is similarly constructed and arranged.

Left leaf spring 3 is pivotally connected through rubber bushing 5 to the channel member 1 of the vehicle body. The load of the body is transmitted through a rubber or similar mounting device 7 onto the leaf spring 3.

The rearward end of the leaf spring 3 is pivotally connected by means of a resilient bushing 9 to a bracket member 11 about a horizontal pivot axis. The bracket member 11 is rigidly secured to the outer end of a rear axle 12. The leaf spring 3 and the manner in which it is connected to the channel-shape portion 1 of the vehicle body and to the axle bracket is similar to the construction described in U.S. Pat. No. 3,860,259, issued Jan. 14, 1975.

A left shock absorber 15 is pivotally connected about a horizontal axis to the bracket member 11 below and to the rear of the axle 12. This pivot construction includes a pivot pin and a resilient bushing. The upper end of the shock absorber 15 is connected to vehicle body structure by a pair of resilient bushings and threaded attachment means on the upper end of the piston rod of the shock absorber 15.

A link 16 is rigidly secured to a mid part of the shock absorber 15. The link 16 extends forwardly from the shock absorber, across the axle 12, and to a pin 17 secured to the bracket member 11. The pin 17 is rigid with the bracket member 11 and extends in a vertical direction. The link 16 has an aperture formed at its forward end and the pin 17 is situated in that aperture. A rubber bushing is interposed between the wall of the aperture in the link 16 and the pin 17 to form a pivotal connection.

The suspension construction illustrated in FIG. 1 of the drawing and described above is duplicated at the right side of the axle 12.

OPERATION

A motor vehicle rear suspension system having a shock absorber mounting means as illustrated in FIG. 1 is characterized by its simplicity of construction and resulting cost saving. The construction enables the axis of the shock absorbers to be closer to the axis of the rear axle thereby reducing the bending loads on the latter as the rear wheels 13 move in jounce and rebound.

The shock absorber mounting means prevents the axle from rotating about a transverse horizontal axis. The mounting constructions of the left and right shock absorbers 15 permit the shock absorbers to serve as reaction members absorbing braking torque forces. If the rear suspension of this invention is used in a vehicle having rear wheel drive then the shock absorbers will also transmit acceleration forces from the axle to the vehicle body.

The resilient bushing at the connection between the lower end of each of the shock absorbers 15 and the bracket 11 and the resilient bushing between the forward end of the link 16 and the pin 17 permits limited lateral compliance and displacement of the vehicle body with respect to the axle 12 and the axle bracket 11. This feature contributes to improved ride and handling characteristics for the vehicle particularly during single wheel jounce and body roll conditions.

ALTERNATE EMBODIMENT

Figure 2:
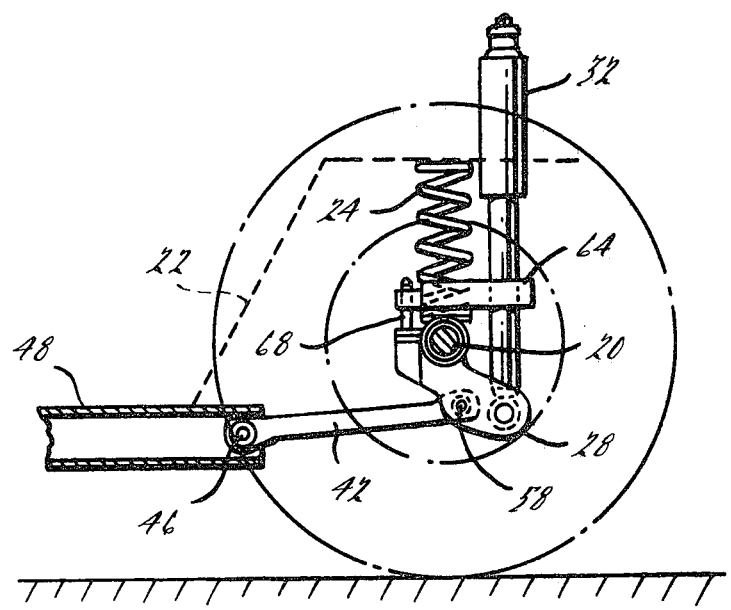
FIG. 2 is a diagrammatic side elevational view of a second embodiment of the invention.

FIGS. 2 and 3 illustrate a second embodiment of the invention. In this embodiment, a rigid rear axle 20 rotatably supports left and right road wheels at its outer ends. The vehicle body 22 is resiliently supported on the axle 20 by means of left and right coil springs 24 and 26 which have their upper ends engaging spring seats formed in the vehicle body and the lower ends engaging spring seats welded to the axle 20. Left and right axle brackets 28 and 30, each having a generally U-shape downwardly open configuration, are welded to the underside of the axle 20 adjacent either end thereof. Left and right shock absorbers 32 and 34 each have an eye at its lower end that contains a resilient bushing. Bolts 36, which pass through the resilient bushings, secure the lower ends of the shock absorbers 32 and 34 to the rearward ends of the left and right axle brackets 28 and 30. Each of the shock absorbers 32 and 34 extends generally upwardly behind the axle 20 and has its upper end connected to the vehicle body portion 38 by means of a mounting construction that includes resilient elements 40.

The transverse axle 20 is located longitudinally in the vehicle body by longitudinally extending suspension arms 42 and 44. The forward end of the left arm 42 supports a resilient bushing 46 which is secured to the U-shape bracket member 48 formed integrally of the vehicle body 22 by means of a bolt 50. Similarly, the right suspension arm 44 is connected to a channel portion 52 of the vehicle body 22 by means of a pivot bolt 54.

The rearward end of the suspension arm 42 has an eye that contains a resilient bushing 56 which is secured to the bracket 28 by means of a pivot bolt 58. A resilient bushing 60 at the rearward end of the right suspension arm 44 is joined to the axle bracket 30 by a pivot bolt 62.

The axle 20 is restrained form rotational movement under torsional loads (such as occur during braking) by the manner in which the shock absorbers 32 and 34 are connected to the axle. The lower ends of the shock absorbers 32 and 34 are secured to the brackets 28 and 30 by the bolts 36 as already described. In addition, links 64 and 66 have their rearward ends rigidly secured, as by welding, to intermediate locations on the left and right shock absorbers 32 and 34. Each of the links 64 and 66 extends forwardly across the axle 20. The forward ends of links 64 and 66 have eyes that contain bushings which engage upstanding pins 68 and 70 welded to the left and right axle brackets 28 and 30.

A Panhard rod 76 has its upper end pivotally connected to a bracket 78 that is welded to the vehicle body 22. The lower end of the Panhard rod 76 is pivotally connected to a bracket welded to the axle 20. Panhard rod 76 is provided for lateral guidance of the axle 20.

In operation, the suspension of FIGS. 2 and 3 functions in a manner broadly similar to that of FIG. 1. During jounce and rebound movement of the axle 20 the suspension arms 42 and 44 locate the axle longitudinally with respect to the vehicle body 22. The vehicle body is resiliently supported on the axle 20 by the left and right coil springs 24 and 26. Jounce and rebound movement of the axle 20 is damped by the hydraulic shock absorbers 32 and 34. During braking, torsional loads on the axle 20 are transmitted to the vehicle body 22 by means of the unique connection between the shock absorbers 32 and 34 and the axle 20.

As in the embodiment of FIG. 1, the shock absorbers prevent the axle 20 from rotating about a transverse horizontal axis. The unique connections between the shock absorbers 32 and 34 and the axle permit the shock absorbers to serve as reaction members for braking torque loads. The pivotal connection between the lower ends of the shock absorbers 32 and 34 with the brackets 28 and 30 and the connection between the links 64 and 66 with the pins 68 and 70 permits roll of the vehicle body about a longitudinal axis without imposing an objectionable bending load on the shock absorbers.

The foregoing description presents the presently preferred embodiments of this invention. Modifications and alterations may occur to those skilled in the art that come within the scope of the following claims.

I claim:

1. A suspension system for a motor vehicle having a vehicle body;
    a transverse axle rotatably supporting left and right road wheels;
    suspension means connected to said axle and connected to said body;
    said suspension means including a telescopic shock absorber strut and mounting means connecting said shock absorber strut to said axle;
    said mounting means comprising a first pivot means operatively interposed between said axle and said strut;
    said mounting means further comprising a link having one of its ends rigidly connected to said shock absorber and its other end connected to said axle by a second pivot means;
    said mounting means being constructed to transmit braking torque loads from said axle to said strut.

2. A suspension system according to claim 1 and including:
    one of said pivot means having a vertical pivot axis.

3. A suspension system according to claim 1 and including:
    one of said pivot means having a transverse horizontal pivot axis and the other of said pivot means having a vertical pivot axis.

4. A suspension system according to claim 1 and including:
    said first pivot means having a transverse horizontal pivot axis located rearwardly of the axis of rotation of said road wheels;
    said second pivot means having a vertical pivot axis located forwardly of the axis of rotation of said road wheels.

5. A rear suspension system for a motor vehicle having a vehicle body;
    an axle rotatably supporting left and right road wheels;
    an axle bracket rigidly secured to said axle;
    a leaf spring having one of its ends pivotally connected to said bracket;
    said leaf spring being connected to said vehicle body and constructed to resiliently support said body on said axle;
    a generally vertically arranged telescopic shock absorber strut having its lower end pivotally connected to said axle bracket by first resilient pivot means;
    said first resilient pivot means having a transverse pivot axis;
    a link rigidly connected to said shock absorber and a second resilient pivot means connecting said link to said bracket;
    said first and second pivot means being constructed to transmit braking torque loads from said axle to said shock absorber strut.

6. A rear suspension system for a motor vehicle having a vehicle body;
    an axle rotatably supporting left and right road wheels;
    an axle bracket rigidly secured to said axle;

a leaf spring having one of its ends pivotally connected to said bracket;

said leaf spring being connected to said vehicle body and constructed to resiliently support a portion of the mass of said body on said axle;

a generally vertically arranged telescopic shock absorber strut having its lower end pivotally connected to said axle bracket by first resilient pivot means;

said first resilient pivot means having a transverse pivot axes located rearwardly and downwardly from the axis of rotation of said road wheels;

a link rigidly connected to said shock absorber and extending forwardly therefrom;

said link being disposed above said axle;

a second resilient pivot means connecting the forward end of said link to said bracket;

said second resilient pivot means having a vertical pivot axis;

said first and second resilient pivot means being constructed to transmit braking torque from said axle to said shock absorber strut.

7. A suspension system for a motor vehicle having a vehicle body;

a transverse axle rotatably supporting left and right road wheels;

suspension means connected to said axle and connected to said body;

said suspension means including a telescopic shock absorber strut;

mounting means comprising vertically spaced apart first and second pivot means connecting said shock absorber strut to said axle;

said second pivot means having a vertical pivot axis;

said mounting means being constructed to transmit braking torque loads from said axle to said shock absorber strut.

8. A suspension system for a motor vehicle having a vehicle body;

a transverse axle rotatably supporting left and right road wheels;

suspension means connected to said axle and connected to said body;

said suspension means including a telescopic shock absorber strut;

mounting means comprising vertically spaced apart first and second pivot means connecting said shock absorber strut to said axle;

said first pivot means having a transverse horizontal pivot axis;

said second pivot means having a vertical pivot axis;

said mounting means being constructed to transmit braking torque loads from said axle to said shock absorber strut.

* * * * *